United States Patent

Maioli et al.

[11] Patent Number: 6,131,293
[45] Date of Patent: Oct. 17, 2000

[54] UNIVERSAL SELF-CENTERING DEVICE FOR HEADS OR SENSORS FOR CHECKING THE TRIM OF THE WHEELS OF MOTOR VEHICLES IN GENERAL

[75] Inventors: Franco Maioli; Gino Ferrari, both of Correggio, Italy

[73] Assignee: Femas S.r.l., Correggio, Italy

[21] Appl. No.: 08/988,030

[22] Filed: Dec. 10, 1997

[30] Foreign Application Priority Data

Dec. 12, 1996 [IT] Italy ................................. RE96A0101

[51] Int. Cl.⁷ .................................................. G01B 5/25
[52] U.S. Cl. ............................ 33/203.18; 33/203.19; 33/203
[58] Field of Search ........................... 33/203.18, 203.19, 33/203

[56] References Cited

U.S. PATENT DOCUMENTS

| | | |
|---|---|---|
| 1,542,133 | 6/1925 | Heinike . |
| 1,891,185 | 12/1932 | Miller et al. ............................. 33/610 |
| 4,011,659 | 3/1977 | Horvallius ............................ 33/203.18 |
| 4,335,519 | 6/1982 | Alsina .................................... 33/203.18 |
| 4,377,038 | 3/1983 | Marshall . |
| 4,823,470 | 4/1989 | Hoervallius . |
| 5,174,032 | 12/1992 | Beck .................................... 33/203.18 |
| 5,664,898 | 9/1997 | Ferrari et al. ............................ 403/37 |
| 5,773,719 | 6/1998 | Ferrari et al. ............................. 73/487 |
| 5,786,751 | 7/1998 | Robby .................................. 33/203.18 |
| 5,862,602 | 1/1999 | Horvallius ............................ 33/203.18 |
| 5,886,258 | 3/1999 | Maioli et al. ............................. 73/487 |

FOREIGN PATENT DOCUMENTS

| | | |
|---|---|---|
| 152864 | 3/1952 | European Pat. Off. .............. 33/203.4 |
| 32 03 981 | 8/1983 | Germany . |
| 42 07 982 | 9/1992 | Germany . |
| 2 149 132 | 6/1985 | United Kingdom . |

Primary Examiner—Diego Gutierrez
Assistant Examiner—Maria Fernandez
Attorney, Agent, or Firm—Guido Modiano; Albert Josif; Daniel O'Byrne

[57] ABSTRACT

A universal self-centering device for heads or sensors for checking the trim of the wheel assemblies of motor vehicles in general, comprising a contoured plate, which is provided with a central hub for supporting a head which is adapted to acquire the trim data of a wheel assembly of a motor vehicle; with a circumferential plurality of radial slots, with which respective double-acting grip claws are slidingly associated, the claws being adapted to engage, from the inside and from the outside, the bead retaining rim of a wheel; and a grip unit, which is adapted to fasten onto the tire mounted on the wheel and comprises a common actuation element, which is placed at the center of the plate and is kinematically coupled to the claws so as to make them slide along the slots with a simultaneous mutual approach or spacing motion.

8 Claims, 6 Drawing Sheets

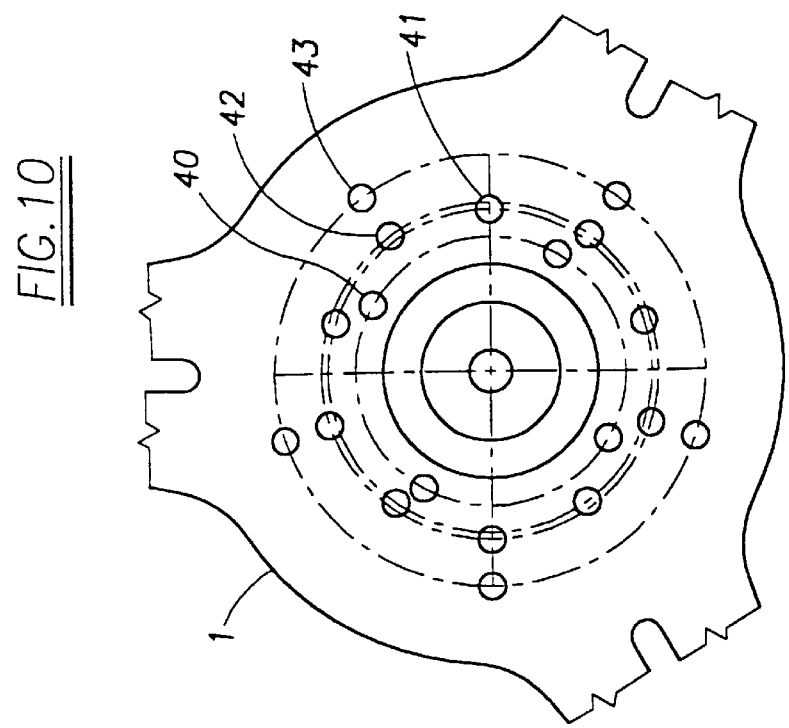
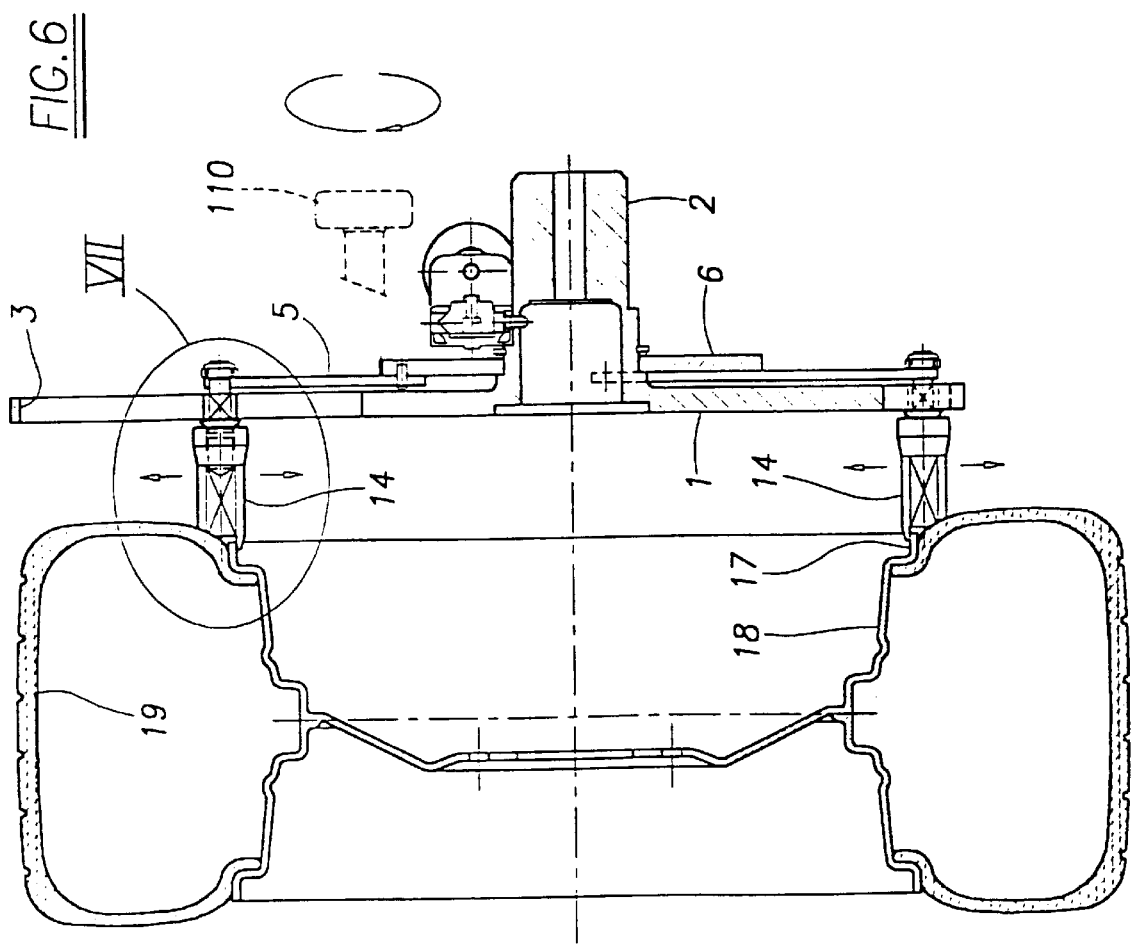

UNIVERSAL SELF-CENTERING DEVICE FOR HEADS OR SENSORS FOR CHECKING THE TRIM OF THE WHEELS OF MOTOR VEHICLES IN GENERAL

BACKGROUND OF THE INVENTION

The present invention generally relates to the field or technique for checking the trim of the wheels of motor vehicles and more particularly it relates to a universal self-centering device for supporting heads or sensors for checking wheel trim and acquiring data related thereto.

It is known that said trim is checked by using adapted heads or sensors for data acquisition detailed description whereof is unnecessary.

It is also known that two procedures can be followed for this checking operation: one uses four heads (two for the front axle and two for the rear axle), while the other one uses two heads for the front axle and two brackets for the rear axle.

The brackets are not described in detail, since they are not a characterizing part of the invention, while the head suspension device will be described further hereinafter.

In any case, adapted data acquisition and transmission means are associated with the heads and are placed under the control of a central unit for processing and displaying the data acquired by the heads.

Self-centering devices are known for associating one of the heads with a wheel of a wheel assembly (wheel+tire) of a motor vehicle; these devices comprise a plurality of identical grip elements, usually termed claws. The claws are usually of the double-acting type, i.e., they are adapted to engage the bead retaining rim of a wheel respectively from the inside (typically for sheet metal wheels) and from the outside (typically for alloy wheels).

Some of these conventional devices have an even number of claws, typically four, in which the claws are mutually connected in pairs so as to form a monolithic unit and thus move together, while in other conventional devices the claws, typically three, are distinct and separate.

The invention relates to devices of the second kind, particularly to those that comprise a contoured plate which is typically shaped like a three-pointed star and is provided with a central hub, which protrudes in order to suspend a data acquisition head, and with a set of three identical slots whose longitudinal axes intersect the longitudinal axis of said hub.

A claw is slidingly associated with each individual slot, at the opposite end with respect to the one occupied by the hub, and is provided with a respective locking and release clamp.

Moreover, these devices are provided with a tire grip unit, which is particularly convenient when the claws engage from the inside the bead retaining rim of a wheel. This is done, as is known to those skilled in the art, in order to keep the free ends of the claws in contact with the side of the bead retaining rim and thus allow the corresponding head to correctly acquire the data of the wheel assembly to be checked even when the outer peripheral margin of the bead retaining rim is damaged.

In particular, the tire grip unit comprises two contoured and adjustable-length arms which are substantially shaped like an L or a pawl and are articulated to the plate along two parallel axes arranged on either side of the hub.

The free end of the arms is shaped like a pointed tooth or wedge and the arms can oscillate between an inactive position, in which they are provided at the side of the plate that is occupied by the hub, and an active position, in which they are at the opposite side. There is also provided a threaded system, by means of which the free ends can be moved mutually closer and further apart in order to engage them with the tire and disengage them therefrom.

The extensive use of such conventional devices has pointed out the following problems.

A first problem arises from the fact that all the claws must be moved and locked individually every time one works on a wheel having a different diameter, and this is inconvenient for the following reasons.

First of all, the positioning and locking of the individual claws entails relatively long and troublesome operations; secondly, this way of working can lead to inaccurate mounting of the device.

This occurs because a relatively inaccurate positioning of the claws of a head supporting device, mounted for example on the rear right wheel assembly of a motor vehicle, may entail, as has indeed been observed, an excessive vertical misalignment of its head with respect to the head of the device that is mounted, for example, on the right front wheel assembly of the motor vehicle.

Since the central data processing and display unit can work only if the vertical misalignment is within a preset allowable range, when the misalignment is out of this range the central unit does not operate, indeed because of the inaccurate mounting of at least one head supporting device; accordingly, the operator must check the entire system and dimount and remount said at least one incorrectly mounted device.

Other problems of these conventional devices arise from the direct articulation to the contoured plate of the curved arms that constitute said tire grip unit.

Owing to this direct articulation:

first of all, the connection of the curved arms to the respective threaded actuation system is constructively complicated and therefore also expensive;

secondly, the presence of the articulations forces to arrange the three points of the star-shaped plate with an irregular angular distribution, i.e., so that two points are spaced for example by 90° from each other and by 135° from the third point, whereas an optimum grip of the claws on the wheel occurs when the three points are angularly equidistant.

Conventional devices have also proved to be unsatisfactory, owing to the fact that the pointed ends of the contoured arms tend to cut into the tire and thus damage it, particularly when the arms are inadvertently fastened with a significant force, as occurs rather often since the screw-and-nut kinematic actuation system does not provide the operator with the sensitivity required to adjust the fastening.

Finally, the conventional devices are inadequate from the point of view of operating flexibility, owing to the fact that they are unable to utilize the centering holes that are provided in the central part of the special wheels currently mounted on high-performance motor vehicles and have the purpose of correctly positioning units or accessories for checking the characteristics of the respective wheel assembly and/or the trim of the corresponding motor vehicle.

Accordingly, in such cases it is possible to achieve optimum control of the wheel assembly and/or of the trim only by means of specific equipment.

SUMMARY OF THE INVENTION

The principal aim of the present invention is to obviate the above problems by means of a simple and rational constructive solution.

According to the invention, this aim is achieved through the means outlined in the appended claims, particularly by kinematically coupling all the claws to a common actuation element, by means of which the claws are subjected to a simultaneous radial sliding motion.

The common actuation element is preferably constituted by a toothed ring which is rotatably mounted on the central supporting hub of the head and is connected to each individual claw by means of a respective linkage.

An actuation means, such as a toothed sprocket, is furthermore associated with the toothed ring, and means for blocking the sprocket in the chosen operating position are associated with the sprocket.

BRIEF DESCRIPTION OF THE DRAWINGS

The above characteristics and others will become apparent from the following detailed description, given with reference to the accompanying drawings, which illustrate, merely by way of non-limitative example, a particular and preferred embodiment thereof, where:

FIG. 6 is a sectional lateral elevation view of the invention, shown coupled to the inner face of the bead retaining rim of the wheel of a wheel assembly;

FIG. 10 is a partial view, taken in the direction X illustrated in FIG. 2;

DESCRIPTION OF THE PREFERRED EMBODIMENT

Figure 1:
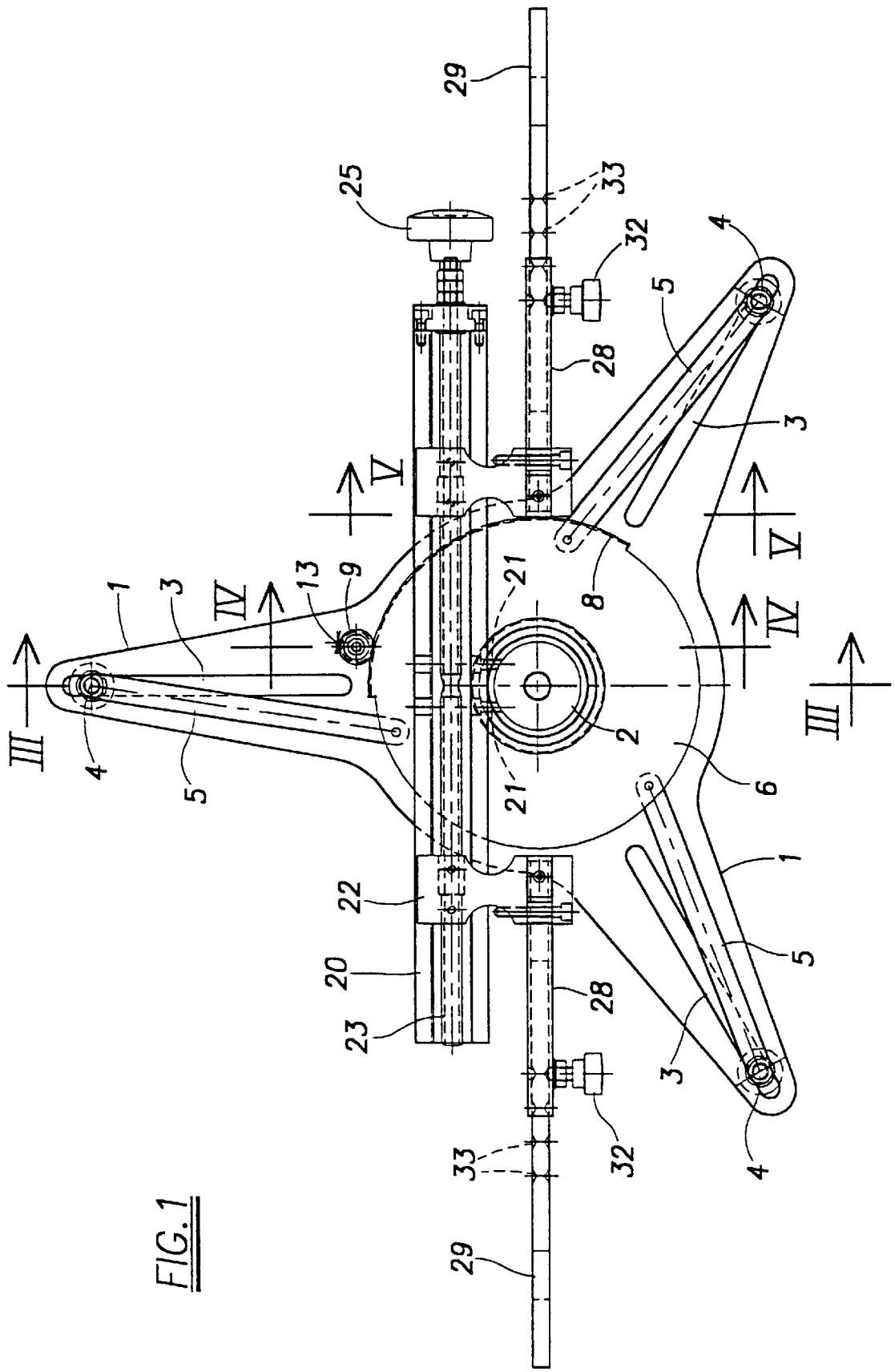
FIG. 1 is a front elevation view of the invention.
Figure 2:
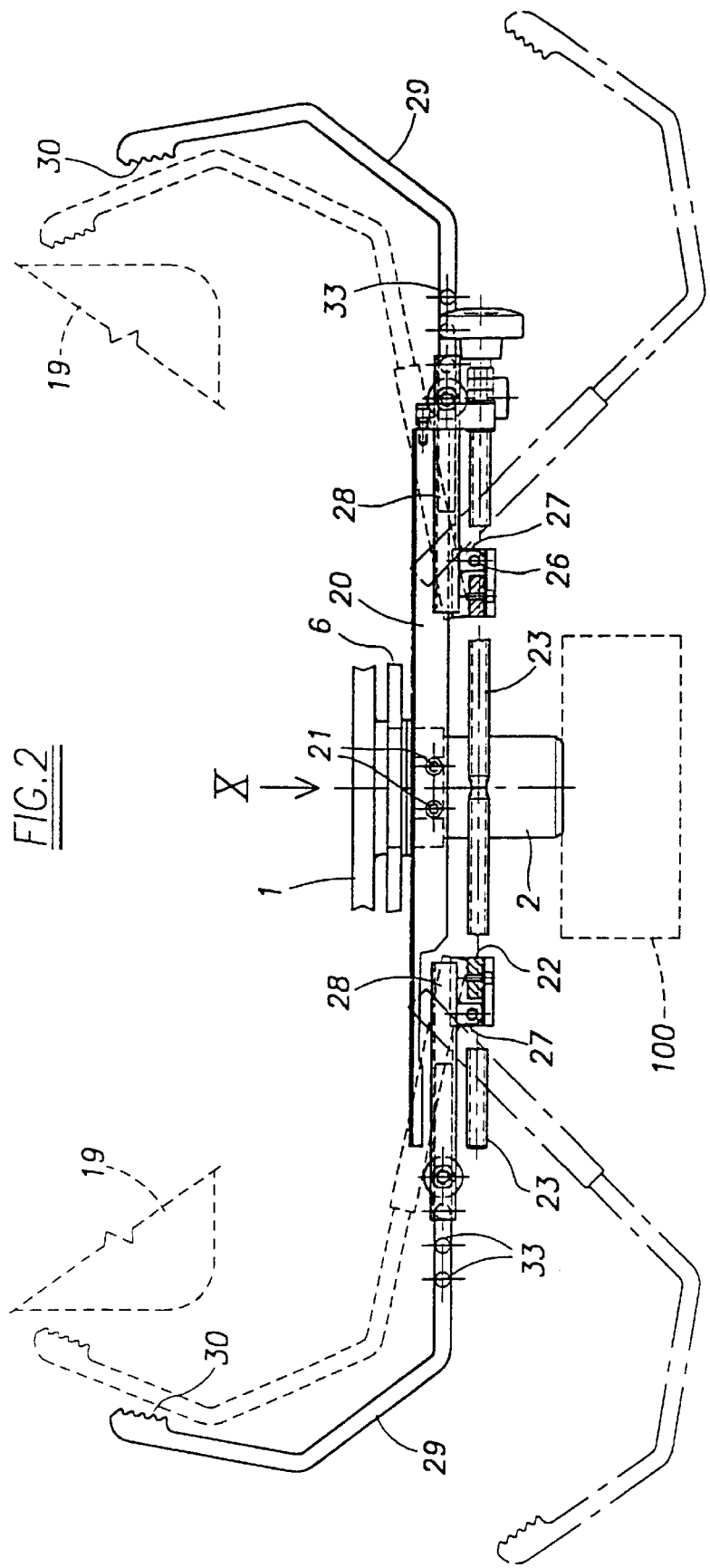
FIG. 2 is a top view, with cutout portions, of FIG. 1.
Figure 3:
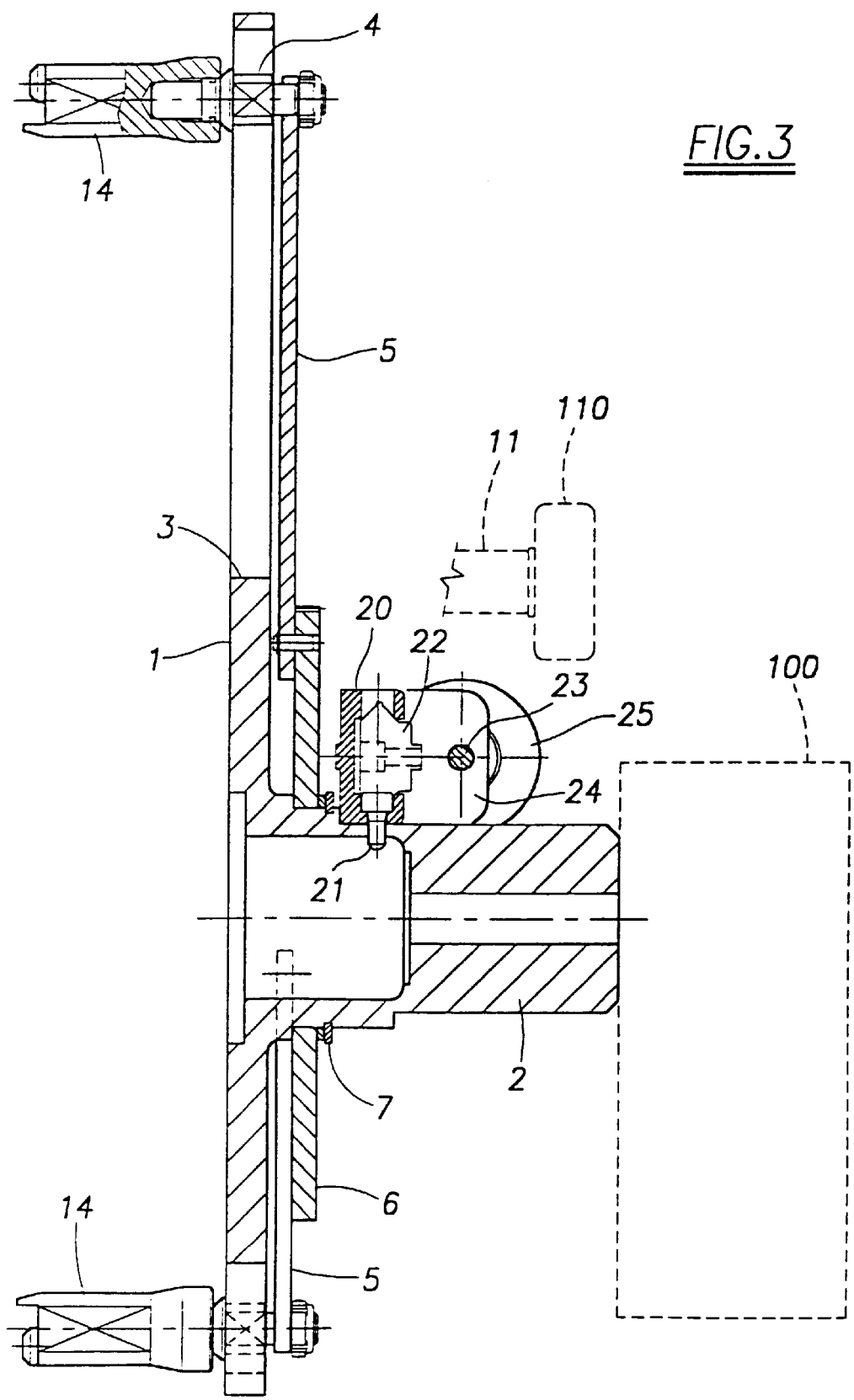
FIG. 3 is a sectional view, taken along the plane III—III of FIG. 1.
Figure 8:
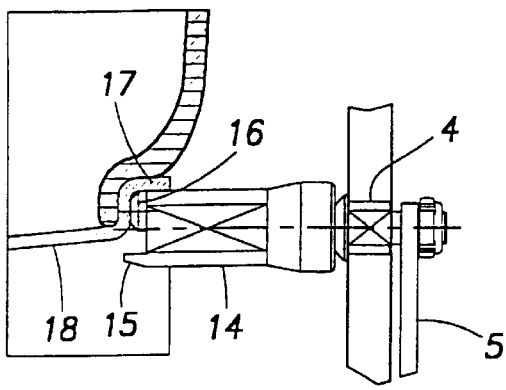
FIG. 8 is a view, fully similar to FIG. 7, of another method of engagement of the internally-acting claw.
Figure 5:
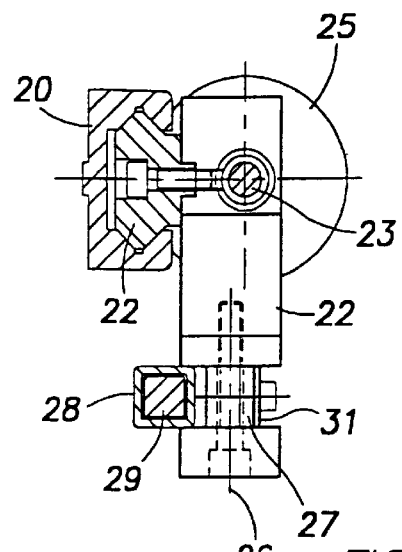
FIG. 5 is an enlarged-scale sectional view, taken along the plane V—V of FIG. 1.
Figure 9:
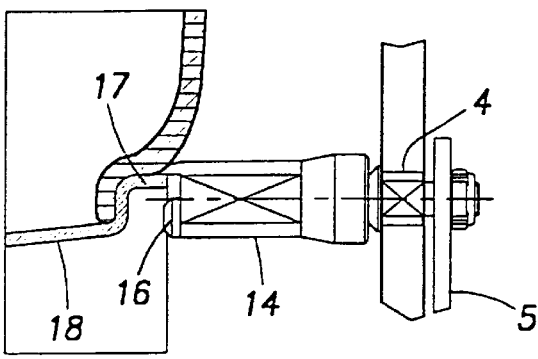
FIG. 9 is a view, fully similar to FIG. 8, of the engagement of said externally-acting claw.
Figure 7:
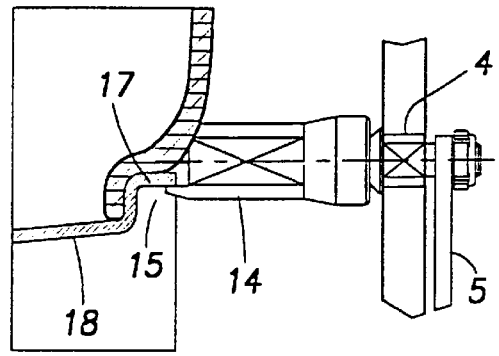
FIG. 7 is an enlarged-scale view of the detail VII shown in the circle of FIG. 6.

The above figures, particularly FIGS. 1 to 3, illustrate a sturdy metal plate 1, typically made of aluminum, which is shaped like a three-pointed star wherein the three points are angularly equidistant by 120°. At this point, it is specified that nothing forbids, as will become apparent hereinafter, the provision of a contour with four points which are also angularly equidistant.

A perforated hub 2 is located at the center of the plate 1 and the points or arms of the star-shaped contour are individually provided with a slot 3, the longitudinal axis of which intersects the axis of the hub 2.

A conventional head for acquiring the trim data of a wheel assembly is meant to be associated with the hub in a manner known per se; the head has been shown schematically and designated by the reference numeral 100 in FIGS. 2 and 3.

As clearly shown, each individual slot 3 has a claw supporting slider, which comprises a through pivot 4 locked axially with respect to the plate 1 and has two diametrically opposite flattened regions which are arranged in sliding contact with the sides of the respective slot 3.

One end of a linkage 5 is articulated to the end of the pivot 4 that is arranged on the side where the hub 2 is located; the other end of the linkage 5 is articulated to a disk 6 which is rotatably mounted at the base of the hub, where it lies between a shoulder and a snap ring 7 (see FIG. 3).

Figure 4:
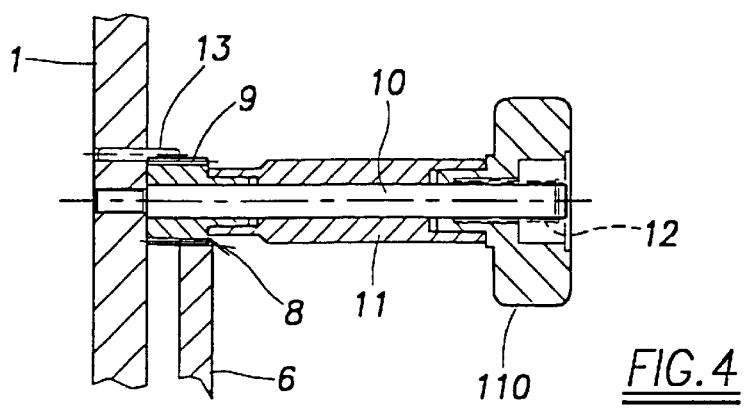
FIG. 4 is an enlarged-scale partial sectional view, taken along the plane IV—IV of FIG. 1.

Moreover, the disk 6 has a partial cylindrical set of teeth 8 (see FIG. 4) with which a toothed sprocket 9 engages; the sprocket is supported by a shaft 10 which is fixed to the plate 1.

In particular, the sprocket 9 is rigidly coupled to the end of a bush 11 which is rotatably and slidingly mounted on the shaft 10 and has an actuation knob 110 at the opposite end. The knob 110 is also provided with a groove which accommodates elastic means interposed between the knob 110 and the shaft 10, in particular a compressed spring 12 which lies between the bottom of said groove and an expanded head located at the free end of the shaft 10.

Finally, a pin 13 is located at the end of the sprocket 9 that lies opposite to the one occupied by the toothed portion 8, thus constituting a torsional locking element and is adapted to be accommodated in the gaps between the teeth of said toothed portion 8. Finally, it is specified that the teeth of the sprocket 9 are longer than the teeth of the toothed portion 8.

Essentially, by pulling the knob 110 in contrast with the thrust of the spring 12 one disengages the sprocket 9 from the pin 13 and therefore the sprocket 9 can be turned in order to turn the disk 6 and therefore make the jaw supporting sliders slide simultaneously closer or further apart.

When the knob 110 is released, the spring 12 returns the sprocket 9 into engagement with the pin 13, consequently blocking the claw supporting sliders in the previously reached positions.

A conventional double-acting head, commonly termed claw 14, is removably engaged, with a conventional snap-on coupling, on the opposite end of the pin 4.

The claw comprises in summary a substantially cylindrical body which has, at one end, a cavity which is adapted to couple to the pin 4 and has, at the other end, a substantially flat rim tooth 15 and a mutually opposite cylindrical pad 16.

The functions of the tooth 15 and of the pad 16 are well-known to those skilled in the art and can also be desumed from the accompanying FIGS. 6 to 9.

Finally, it is noted that the claws 14 can engage from the outside or from the inside the bead retaining rim 17 of a wheel 18 of a tire 19 and that the device is supported by the tire through the means described hereafter.

These means comprise, see again FIGS. 1 to 3, a guiding bar 20 which is shaped like a channel, is placed so as to straddle the hub 2 and is fixed by means of screws 21 at a flattened region formed in the upper part of the base of the hub 2.

Two mutually opposite sliders 22 are accommodated with an easy sliding push fit in the guide and are actuated so as to slide mutually closer or further apart by a threaded bar 23.

The bar 23 is provided with two portions with worm screws which wind in opposite directions and are engaged with respective through threaded seats formed on the sliders 22; the bar 23 is rotatably mounted and axially locked with respect to a head plate 24, beyond which it has an actuation knob 25.

The sliders 22 extend downwards, where they have a recess in which a tab 27 that protrudes from a hollow prism-like rod 28 is accommodated and articulated about an axis 26 which is perpendicular to the hub 2 and to the bar 23.

One end of a contoured arm 29 which is substantially hook-shaped is slidingly accommodated in the rod 28; the other end of the arm has a pad 30, which forms an active end portion, provides a surface having a high friction coefficient and is adapted to clamp onto the tire 19 under the actuation of the threaded bar 23.

The degree to which the arm 29 is inserted in the hollow rod 28 can be selected as a function of the outside diameter of the tire 19 by means of a locking and release screw 32 which is tapped in the rod 28 and is adapted to couple to complementary recesses 33 formed on the arm 29.

Furthermore, according to an advantageous characteristic of the invention, the pad 30 is shaped like an irregular surface which in the illustrated case is shaped like a portion of a fine saw-toothed set of teeth, constituted by a plurality of small parallel ribs, wherein the teeth or ribs have radiused free ends, i.e. each rib has a radiused cusp, and are arranged transversely to the arm 29.

Therefore, good grip of the pad 30 is ensured and damage to the tire 19 is avoided even in the presence of relatively intense clamping forces.

There is also provided a leaf spring 31 which is adapted to make contact with two adjacent flat faces of the tab 27, by means of which the arm 29 can occupy the inactive position, which is shown in dot-and-dash lines in FIG. 2, and the intermediate position, shown in solid lines in the figure.

Dashed lines instead show the active position of the arm 29, set by the resting of the hollow rod 28 against a stroke limiting abutment of the respective slider 22.

According to another advantageous characteristic of the invention, see FIG. 10, on the face of the plate 1 that is meant to be directed towards the wheel 18 there are provided four circumferential sets of holes concentric to each other and to the hub 2, wherein the holes of each individual set are angularly equidistant and are designated by the reference numerals 40, 41, 42 and 43 respectively from the inside.

In particular, the number of holes of each set and the respective circumference along which they are distributed correspond to the centering holes provided, as already mentioned, on the special-type wheels which are currently fitted on high-performance motor vehicles.

Figure 13:
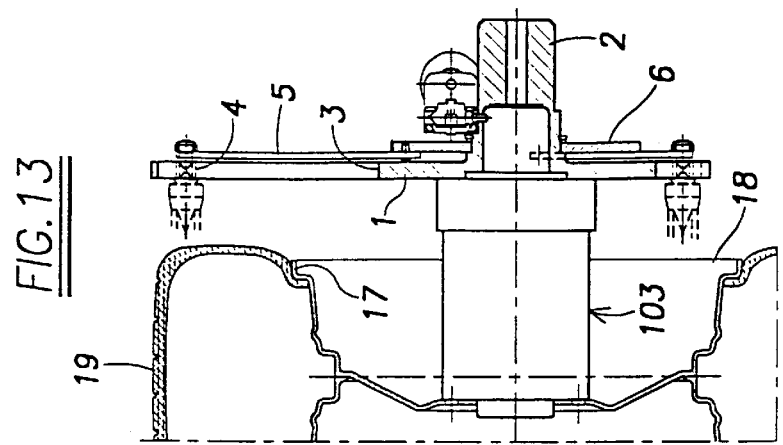
FIG. 13 is a view, fully similar to FIG. 12, of the invention associated with a special wheel which is different from the ones shown in FIGS. 11 and 12.
Figure 12:
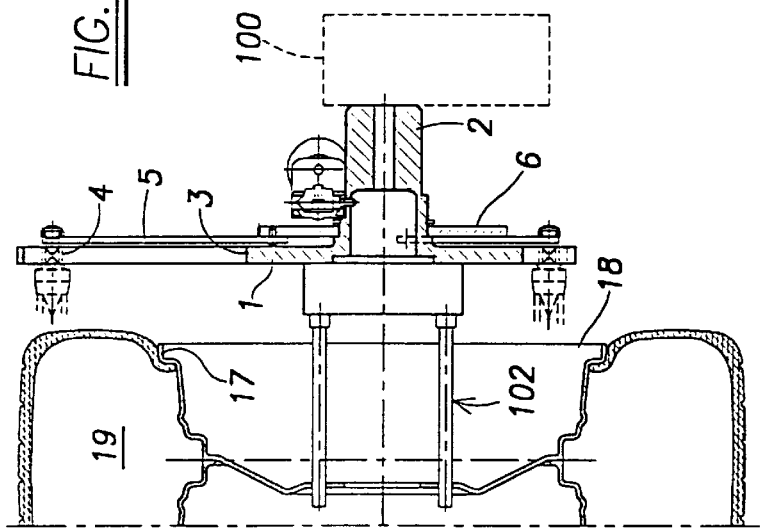
FIG. 12 is a view, fully similar to FIG. 11, of the invention associated with a special wheel which is different from the one of FIG. 11.
Figure 11:
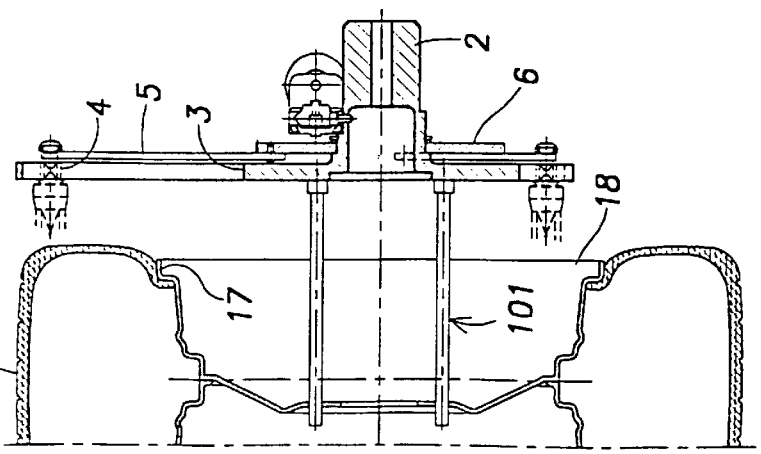
FIG. 11 is a sectional lateral elevation view of the invention associated with a special-type wheel.

The holes are also visible in the accompanying FIGS. 11 to 13, with reference to which it is specified that when checking the trim of a wheel assembly provided with a special-type wheel, the device of the invention utilizes the accessories that are designated in the figures by the reference numerals 101, 102 and 103 respectively and are usually provided by the manufacturers of the special wheels. It is also specified that during the checking of such special wheels the claws 14 are not used and are preferably removed from the respective pins 4 and obviously the arms 29 are used.

In particular, the accessory 101 comprises a plurality of cylindrical rods which are meant to be inserted, at one end, in the respective set of holes of the wheel and are inserted at the other end, where they have an abutment shoulder, in the respective set of holes of the plate 1.

The accessory 102 comprises a base which has, on one side, a plurality of rods meant to be inserted in the respective plurality of holes of the wheel, and has, on the other side, a set of pins which are aligned with the rods and are adapted to be accommodated in the respective series of holes of the plate 1.

Finally, the accessory 103 comprises a cylindrical body which is provided with two mutually opposite circular pads: one is adapted to be accommodated in the central hole of the wheel and the other one is adapted to be received in the central hole of the plate 1.

The advantages of the invention and its use are clearly desumable from the above description and from the accompanying figures.

Finally, the device according to the invention can be considered to be a universal device.

It is understood that the invention is not limited to what has been illustrated and described but includes all technical equivalents of the mentioned means and their combinations, if provided within the scope of the appended claims.

What is claimed is:

1. A universal self-centering device for heads or sensors for checking the trim of a wheel having a bead retaining rim, in wheel assemblies of motor vehicles in general, comprising a contoured plate, which is provided with: a central hub for supporting the heads or sensors which is adapted to acquire the trim data of a wheel assembly of a motor vehicle; a circumferential set of radial slots provided at said contoured plate; double-acting grip claws slidingly associated in said radial slots, said claws being able to engage the bead retaining rim of the wheel to be checked; a grip unit connectable at a region of said hub for fastening onto a tire mounted on said wheel; and a common actuation element, which is placed at the center of said plate and is kinematically coupled to said claws so as to make said claws slide along said slots with a simultaneous mutual approach or spacing motion.

2. A device according to claim 1, wherein said common actuation element comprises a toothed ring which is rotatably mounted and axially locked on said central hub, is connected to said claws by means of respective linkages and is engaged with an actuation means being locked in the chosen operating position.

3. A device according to claim 2, wherein said actuation means is constituted by a toothed sprocket which is rotatably and slidingly mounted on a shaft fixed to said plate and is provided with an actuation knob, wherein elastic means are interposed between said knob and said shaft and are adapted to keep said sprocket constantly pushed towards a torsional locking element which is rigidly coupled to the plate.

4. A device according to claim 3, wherein said torsional locking element is constituted by a pin adapted to be accommodated in the gaps between the teeth of said sprocket.

5. A device according to claim 1, wherein said grip unit comprises two mutually opposite contoured arms which have an adjustable length and are adapted to oscillate on a plane which contains the longitudinal axis of said hub, so as to occupy an inactive position, in which they are located on the side where said hub is located, and an active position, in which they are provided on the opposite side and in which they direct towards the tire respective active end portions which are adapted to engage from said tire and disengage from it under the control of respective sliders actuated by a threaded rod which has two portions with worm screws which wind in mutually opposite directions, wherein said two sliders have respective protruding contoured parts where there are provided supporting and articulation seats for said contoured arms.

6. A device according to claim 5, wherein said contoured plate is shaped as a three-pointed star plate, with arms thereof bearing each a respective one of said radial slots, said arms of said star plate being angularly equidistant from each other.

7. A device according to claim 5, wherein said active end portion of said contoured arms is constituted by a surface having a high friction coefficient which comprises a plurality of small parallel ribs which have radiused free ends and are arranged transversely to their arm.

8. A device according to claim 1, wherein a set of circumferential series of angularly equidistant holes is provided on the side of the plate that is opposite to the one occupied by said hub, said series of holes being concentric to each other and to said hub, each individual series of holes being meant to receive accessories which are adapted to couple to centering holes formed on the wheel of the wheel assembly to be checked.

* * * * *